Jan. 5, 1960    J. W. RIDDLE ET AL    2,919,952
REAR WINDOW CLEANING DEVICE
Filed Nov. 25, 1958

John W. Riddle
Erick G. Lundgren
INVENTORS

United States Patent Office 2,919,952
Patented Jan. 5, 1960

2,919,952
REAR WINDOW CLEANING DEVICE
John W. Riddle and Erick G. Lundgren, Libby, Mont.

Application November 25, 1958, Serial No. 776,235

1 Claim. (Cl. 296—91)

This invention relates to a device for removing dust and dirt from the outside surface of a motor vehicle window and also for preventing the accumulation of dirt and dust thereon.

An object of the invention is to provide an attachment for a motor vehicle to maintain the rear window thereof in a cleanly condition by the direction of a draft across the outside surface of the window, the draft being created by the forward motion of the motor vehicle and deflected across the surface of the window.

A further object of the invention is to provide a mechanically simple device for cleaning and maintaining the outside furnace of a motor vehicle window in a cleanly condition, the device consisting essentially of a lightweight casing with side walls arranged to function as an air scoop and an air discharge nozzle.

The device is very easily applied to the rear part of a motor vehicle, for instance to the rain gutter at the rear end of the roof line of a stationwagon, and when applied it does not interfere with the normal opening and closing of the doors but yet, the device is capable of deflecting a sufficient air stream to achieve the intended functions of cleaning the window and maintaining it in a cleanly condition. This is especially important in areas where there is considerable atmospheric dust.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
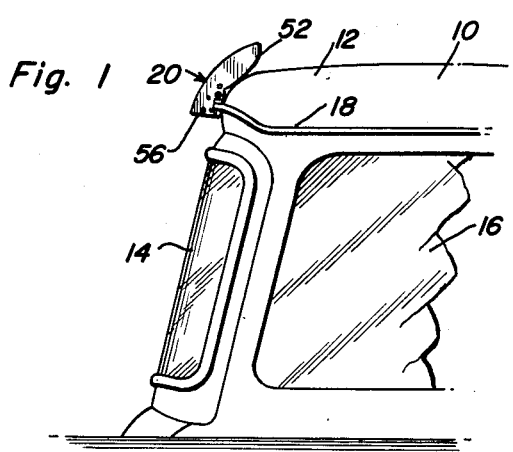
Figure 1 is a fragmentary side view of a part of a motor vehicle with the device attached above the rear window thereof.
Figure 2:
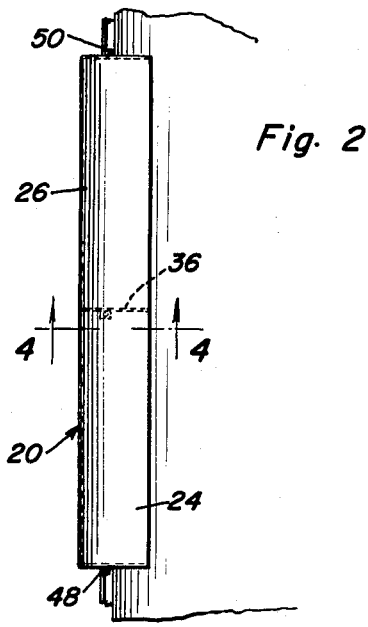
Figure 2 is a fragmentary top view of the device in Figure 1.
Figure 3:
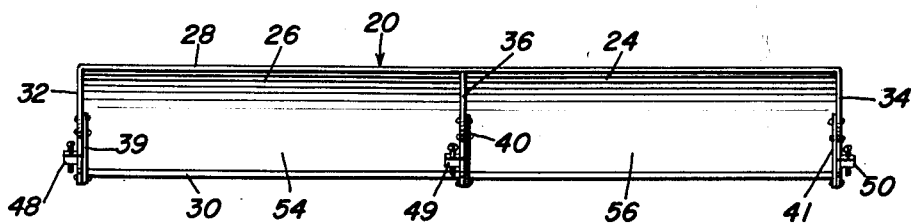
Figure 3 is a rear elevational view of the device.
Figure 4:
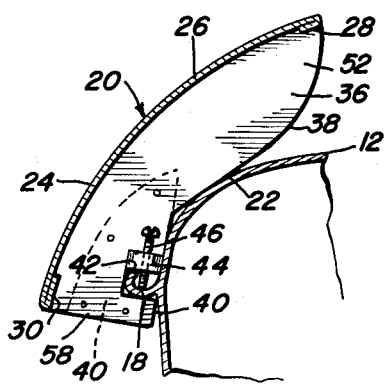
Figure 4 is a cross sectional view on enlarged scale and taken on the line 4—4 of Figure 2.

In the accompanying drawing there is a fragment of a motor vehicle 10. The illustrated motor vehicle is a stationwagon having a roof 12, a rear window 14, a side window 16 and a rain gutter 18 above the windows and at the edge of the roof line. The rear window clearing device 20 is attached at the rear end of the roof 12, it being suggested that the device be secured to the rain gutter 18 and partially supported by the roof as at 22 (Figure 4).

Device 20 is made of a housing 24 consisting of a smoothly curved elongated side wall 26 having hems 28 and 30, rolled edges or the like at the upper and lower longitudinal edges. The device may be made of lightweight metal, plastic or other substances, although lightweight metal is preferred. There are end walls 32 and 34 attached to the ends of the wall 26, and an intermediate wall 36 which is also secured to wall 26. Each of the end walls and intermediate wall has a smoothly curved upper edge portion 38 and an essentially straight lower edge portion 40. The smoothly curved upper edge portion has a part which may contact as at 22, the roof 12 for partial support and rigidity in the connection between the device and the motor vehicle. There are three lug plates 39, 40 and 41 secured to the walls 32, 36 and 34 respectively. Each lug plate has a notch 42 (Figure 4) through which a fixed nut 44 extends. The notch also provides an entrance for the rain gutter 18. A fastener, for example screw 46, is threaded through a nut 44 and has a lower end which seats against the bottom wall of the rain gutter 18 thereby clamping the device in place on the motor vehicle. There are three identical locking devices 48, 49 and 50, each consisting of a lug plate, notch, nut and screw, and each engageable with the rear part of the same rain gutter 18 in connecting the device 20 to the motor vehicle.

A device constructed as aforesaid, has a part projecting above the level of the roof thereby providing an air entrance 52 to receive air under ram pressure as the motor vehicle is moved forward. The air is conducted through the two passageways 54 and 56 formed by the walls of the housing and divided by intermediate wall 36. The air, flowing through the passageways 54 and 56 is discharged through the air outlet 58 at the lower end of the housing and when installed properly, immediately above the rear window 14 and in a direction to sweep across the outside surface of the rear window thereby both cleaning the rear window and preventing the accumulation of dirt and dust thereon.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A device to maintain a window of a motor vehicle in a cleanly condition and to clean the outside surface of the window wherein the motor vehicle has a roof and a gutter at approximately the roof line and above the window, said device comprising a housing having an elongate side wall which is curved in cross-section, end walls attached to said side wall, each end wall having a notch to provide a gutter entrance and within which the gutter is adapted to be disposed when the device is installed on the vehicle, fastening means on said end walls and at said notches for engaging the gutter above the window to be cleaned and to have maintained in a cleanly condition, a portion of said side wall projecting above the roof level and having an air entrance facing forwardly of the vehicle, said device having an air outlet below the roof line of the vehicle and facing in a direction to discharge an air stream over the outside surface of the window, an edge portion of each end wall contacting a part of the roof to lend additional support to the device when said fastening means holds said device attached to the motor vehicle, an intermediate wall located between said end walls and attached to said side wall, lug plates on said intermediate wall and said end walls, and said fastening means each incuding a fastener, and means adjustably connecting said fasteners to said lug plates so that said device is supported on the motor vehicle at at least three spaced places along the gutter.

References Cited in the file of this patent
UNITED STATES PATENTS

| 1,584,275 | Chalkley | May 11, 1926 |
| 2,326,316 | Allen | Aug. 10, 1943 |
| 2,447,246 | Groboski et al. | Aug. 17, 1948 |

FOREIGN PATENTS

| 544,859 | France | July 5, 1922 |
| 809,998 | Germany | Jan. 19, 1953 |